US006478889B2

(12) United States Patent
Kanekiyo

(10) Patent No.: US 6,478,889 B2
(45) Date of Patent: Nov. 12, 2002

(54) IRON-BASE ALLOY PERMANENT MAGNET POWDER AND METHOD FOR PRODUCING THE SAME

(75) Inventor: Hirokazu Kanekiyo, Kyoto (JP)

(73) Assignee: Sumitomo Special Metals Co., Ltd. (JP)

( * ) Notice: Subject to any disclaimer, the term of this patent is extended or adjusted under 35 U.S.C. 154(b) by 22 days.

(21) Appl. No.: 09/734,884

(22) Filed: Dec. 13, 2000

(65) Prior Publication Data

US 2001/0015239 A1 Aug. 23, 2001

(30) Foreign Application Priority Data

Dec. 21, 1999 (JP) ............................................. 11-362103

(51) Int. Cl.⁷ ............................................. H01F 1/057
(52) U.S. Cl. ..................................... 148/302; 252/62.54
(58) Field of Search ............................ 148/302; 420/83, 420/121; 252/62.55

(56) References Cited

U.S. PATENT DOCUMENTS 5,022,939 A * 6/1991 Yajima et al. ............... 148/302
5,051,200 A * 9/1991 Srail et al. ................ 252/62.55
6,344,168 B1 * 2/2002 Kuniyoshi .................. 148/302

FOREIGN PATENT DOCUMENTS

| EP | 0 935 260 | 8/1999 |
|----|-----------|--------|
| EP | 0 959 478 | 11/1999 |
| EP | 1 018 751 | 7/2000 |
| JP | 01-162702 | 6/1989 |
| JP | 03-014203 | 1/1991 |
| JP | 07-188704 | 7/1995 |
| JP | 10-298612 | 11/1998 |
| JP | 10-317003 | 12/1998 |

* cited by examiner

Primary Examiner—John Sheehan
(74) Attorney, Agent, or Firm—Nixon Peabody LLP; Jeffrey L. Costellia

(57) ABSTRACT

The method for producing iron-base alloy permanent magnet powder of the present invention includes the steps of: chilling an Fe—R—B molten alloy by melt quenching, thereby forming a rapidly solidified alloy having a thickness in a range of 80 $\mu$m to 300 $\mu$m; crystallizing the rapidly solidified alloy by heat treatment, thereby producing an alloy having permanent magnet properties; and pulverizing the alloy to produce powder having an average particle size in a range of 50 $\mu$m to 300 $\mu$m or less and a ratio of minor axis size to major axis size of powder particles in a range of 0.3 to 1.0.

5 Claims, 6 Drawing Sheets

IRON-BASE ALLOY PERMANENT MAGNET POWDER AND METHOD FOR PRODUCING THE SAME

FIELD OF THE INVENTION

The present invention relates to powder of iron-base alloy permanent magnets that are suitable as magnets used for electrical appliances such as motors, actuators, speakers, meters, and focus/convergence rings, and a method for producing such powder. The present invention also relates to bonded magnets manufactured from the above powder, and various types of electrical appliances provided with the bonded magnets.

BACKGROUND OF THE INVENTION

An Fe—R—B alloy nanocomposite magnet is an iron-base alloy permanent magnet where crystallites of a soft magnetic Fe boride such as $Fe_3B$ and $Fe_{23}B_6$ and crystallites of a hard magnetic $R_2Fe_{14}B$ phase are uniformly distributed in the same metal structure and magnetically coupled to each other as a result of exchange interactions therebetween.

Although the nanocomposite magnet contains the soft magnetic crystallites, it exhibits excellent magnetic properties by the magnetic coupling of the soft magnetic crystallites with the hard magnetic crystallites. In addition, since the soft magnetic crystallites do not include any rare-earth element (R) such as neodymium, the total amount of rare-earth elements contained in the magnet is small. This reduces the production cost and thus is suitable for stable supply of the magnet.

The nanocomposite magnet of this type is produced by solidifying a molten material alloy by melt quenching and then appropriately heat-treating. A single roll method is often employed for quenching a molten material alloy, where a molten material alloy is brought into contact with a rotating chill roll to be chilled and solidified. According to this method, the quenched alloy is in the shape of a strip (or ribbon) elongated in the direction of the circumferentially rotating direction of the chill roll.

Conventionally, the roll is operated at a surface velocity of 15 m/sec or more to produce a quenched alloy strip having a thickness of 50 μm or less. The resulting quenched alloy strip is heat-treated to impart permanent magnet properties, and then pulverized to obtain magnet powder having an average particle size of 300 μm or less. The magnet powder is then formed into a permanent magnet having a desired shape by compaction or injection molding.

When a relatively thin quenched alloy strip having a thickness of 50 μm or less is pulverized to obtain powder having an average particle size of 300 μm or less, the resultant powder particles are flat in shape. Such magnet powder produced by the above conventional technique is therefore poor in packing density and flowability, with the magnet powder packing density being 80% at maximum for compaction and 65% for injection molding. The magnet powder packing density influences the properties of the permanent magnet as a final product. It is therefore strongly desired to increase the magnet powder packing density for improvement of the properties of the permanent magnet.

A primary object of the present invention is providing iron-base alloy permanent magnet powder with improved packing density and flowability during compaction, of which particles have a roughly spherical shape, not a conventional flat shape, and a method for producing such iron-base alloy permanent magnet powder.

It is also an object of the present invention to provide a bonded magnet having excellent permanent magnet properties manufactured using the above iron-base alloy permanent magnet powder with improved packing density, and electrical appliances including such a bonded magnet.

SUMMARY OF THE INVENTION

The method for producing iron-base alloy permanent magnet powder of the present invention includes the steps of: chilling an Fe—R—B molten alloy by melt quenching, thereby forming a rapidly solidified alloy having a thickness in a range of 80 μm to 300 μm; crystallizing the rapidly solidified alloy by heat treatment, thereby producing an alloy having permanent magnet properties; and pulverizing the alloy to produce powder having an average particle size in a range of 50 μm to 300 μm and a ratio of minor axis size to major axis size of powder particles in a range of 0.3 to 1.0.

In a preferred embodiment, the method further includes the step of coarsely pulverizing the rapidly solidified alloy before the heat treatment. The step of pulverizing is preferably carried out with a pin disk mill.

In another preferred embodiment, the rapidly solidified alloy includes at least one metastable phase selected from the group consisting of $Fe_{23}B_6$, $Fe_3B$, $R_2Fe_{14}B$, and $R_2Fe_{23}B_3$ and/or an amorphous phase, before the heat treatment.

In yet another preferred embodiment, the alloy having permanent magnet properties is a permanent magnet represented by a general formula, $Fe_{100-x-y}R_xB_y$ (R is at least one rare earth element selected from the group consisting of Pr, Nd, Dy, and Tb), wherein x and y in the general formula satisfy the relationships of 1 at $\% \leq x \leq 6$ at %, and 15 at $\% \leq y \leq 25$ at %, and the alloy contains iron, an alloy of iron and boron, and a compound having a $R_2Fe_{14}B$ crystal structure as component phases, the average crystal grain sizes of the component phases being 150 nm or less.

In the chilling step, the molten alloy is preferably brought into contact with a roll rotating at a surface velocity in a range of 1 m/sec to 13 m/sec, thereby forming the rapidly solidified alloy.

The chilling step preferably includes the step of quenching the Fe—R—B molten alloy in a reduced atmosphere. The absolute pressure of the decompressed atmosphere is preferably 50 kPa or less. Preferably, the alloy obtained by the crystallization by heat treatment is a nanocomposite magnet.

The method for manufacturing a bonded magnet of the present invention includes the steps of: preparing iron-base alloy permanent magnet powder produced by any of the methods for producing iron-base alloy permanent magnet powder described above; and compacting the ion-base alloy permanent magnet powder.

In a preferred embodiment, the iron-base alloy permanent magnet powder is compacted at a packing density exceeding 80%.

In another preferred embodiment, the iron-base alloy permanent magnet powder is molded by injection molding at a packing density exceeding 65%.

The iron-base alloy permanent magnet powder of the present invention is represented by a general formula, $Fe_{100-x-y}R_xB_y$ (R is at least one element selected from the group consisting of Pr, Nd, Dy, and Th), wherein x and y in the general formula satisfy the relationships of 1 at $\% \leq x \leq 6$ at %, and 15 at $\% \leq y \leq 25$ at %. The powder contains iron, an alloy of iron and boron, and a compound having a $R_2Fe_{14}B$ crystal structure as component phases. The average crystal grain sizes of the component phases is 150 nm or less. The average particle size of the powder is 300 μm or less, and a ratio of minor axis size to major axis size of powder particles is in a range of 0.3 to 1.0.

The bonded magnet of the present invention includes the iron-base alloy permanent magnet powder described above. The packing density exceeds 80% of maximum when the bonded magnet is manufactured by compaction, and it exceeds 65% of maximum when the bonded magnet is manufactured by injection molding.

The electrical appliance of the present invention is provided with the bonded magnet described above.

DETAILED DESCRIPTION OF THE INVENTION

Figure 1A:
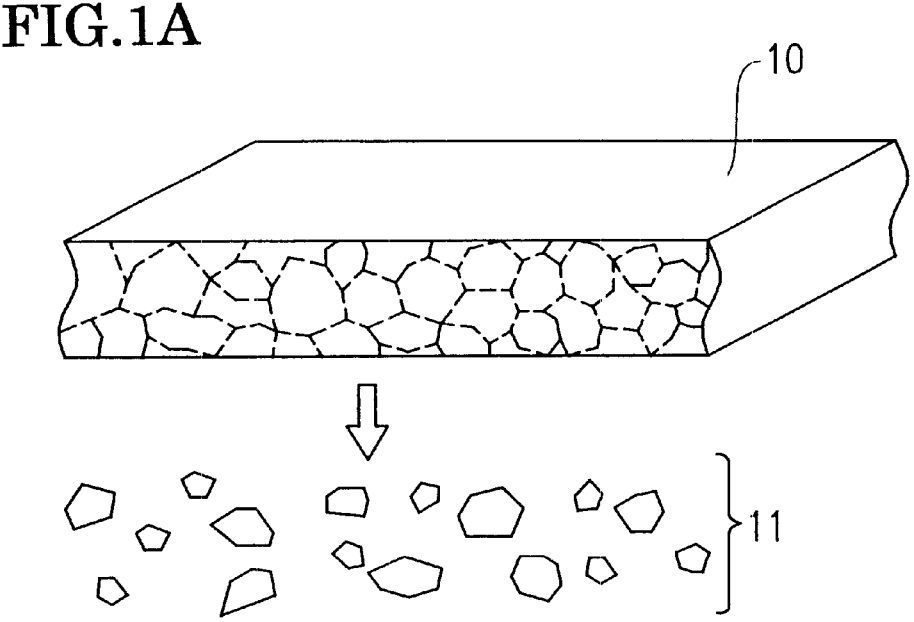
FIG. 1A is a perspective view schematically illustrating an alloy strip before pulverization and pulverized powder particles according to the present invention.

According to the present invention, first, an Fe—R—B molten alloy is chilled by a quenching technique such as a jet cast method and a strip cast method, to produce a rapidly solidified alloy having a thickness in the range of 80 μm to 300 μm. The resultant rapidly solidified alloy is heat-treated to be provided with permanent magnet properties, and then pulverized to obtain powder having an average particle size of 50 μm to 300 μm and a ratio of minor axis size to major axis size of powder particles in the range of 0.3 to 1.0. According to the present invention, 60 wt. % or more of particles of the powder having a size exceeding 50 μm can have a ratio of minor axis size to major axis size in the range of 0.3 to 1.0.

As the Fe—R—B alloy, preferably used is an alloy represented by $Fe_{100-x-y}R_xB_y$ (Fe is iron, R is at least one rare earth element selected from the group consisting of Pr, Nd, Dy, and Th, and B is boron). In a preferred embodiment, x and y in the above general formula satisfy the relationships of 1 at %≦x≦6 at %, and 15 at %≦y≦25 at %. In a preferred embodiment, a molten alloy having the above composition is chilled by melt quenching to produce a rapidly solidified alloy including an amorphous phase. The rapidly solidified alloy is then heated to generate crystallites in the component phases. The quenching is preferably carried out in a decompressed atmosphere to obtain a uniform structure. In a preferred embodiment, the molten alloy is brought into contact with a chill roll thereby producing a rapidly solidified alloy.

According to the present invention, the thickness of the alloy strip immediately after the rapid solidification is in the range of 80 μm to 300 μm, as described above. When a melt spinning method such as a single roll method is employed, the thickness of the alloy strip immediately after the rapid solidification can be controlled to be within the range of 80 μm to 300 μm by adjusting the surface velocity of the chill roll to fall within the range of 1 m/sec to 13 m/sec. The reason for this control of the thickness of the alloy strip is as follows.

If the roll surface velocity is less than 1 m/sec, the thickness of the resultant quenched alloy strip exceeds 300 μm, and a quenched alloy structure rich in coarse α-Fe and $Fe_2B$ is formed. As a result, when the alloy strip is heat-treated, the hard magnetic $R_2Fe_{14}B$ phase is not generated, and the resulting powder fails to exhibit permanent magnet properties.

If the roll surface velocity exceeds 13 m/sec, the thickness of the resultant quenched alloy strip is below 80 μm. In a pulverizing process after heat treatment, the alloy strip is likely to rupture in a direction substantially vertical to the contact surface of the roll (direction along the thickness of the alloy strip). As a result, pulverized powder particles from the quenched alloy strip are likely to be flat in shape, having a ratio of minor axis size to major axis size of less than 0.3. Improvement in magnet powder packing density is difficult for such flat powder particles of which the ratio of minor axis size to major axis size is below about 0.3.

In view of the above, in the preferred embodiment, the roll surface velocity is adjusted so that the thickness of the quenched alloy strip is set in the range of 80 μm to 300 μm. As a result, it is possible to produce magnet powder having an average particle size of 300 μm or less and a ratio of minor axis size to major axis size in the range of 0.3 to 1.0. The size ratio is more preferably in the range of 0.4 to 1.0.

Before heat treatment for crystallization, the rapidly solidified alloy may include an amorphous structure, or a metal structure where an amorphous phase is mixed with at least one metastable phase selected from the group consisting of $Fe_{23}B_6$, $Fe_3B$, $R_2Fe_{14}B$, and $R_2Fe_{23}B_3$. As the cooling rate is higher, the proportion of the metastable phase decreases while that of the amorphous phase increases.

Crystallites generated by heat-treating the rapidly solidified alloy are made of iron, an alloy of iron and boron, a compound having $R_2Fe_{14}B$ crystal structure, and the like. The average crystal grain sizes of the component phases are preferably 150 nm or less, more preferably 100nm or less, further more preferably 60 nm or less. According to the present invention, therefore, the pre-pulverized alloy strip (thickness: 80 to 300 μm), which is constructed of the crystallites described above, is likely to rupture in a variety of orientations during pulverizing process. As a result, presumably, roughly spherical powder particles are likely to be obtained. In other words, according to the present invention, the resultant powder particles are not in a shape elongating in a certain orientation, but in an isometric shape, i.e., in a roughly spherical shape.

If the thickness of the alloy strip is less than 80 μm as obtained by increasing the roll surface velocity, the metal structure of the alloy strip tends to be aligned in an orientation vertical to the roll contact surface. Therefore, the alloy strip easily ruptures along this orientation. The resultant pulverized powder particles are likely to be in a shape elongating in the orientation parallel to the surface of the alloy strip, with the ratio of minor axis size to major axis size of less than 0.3.

Figure 1B:
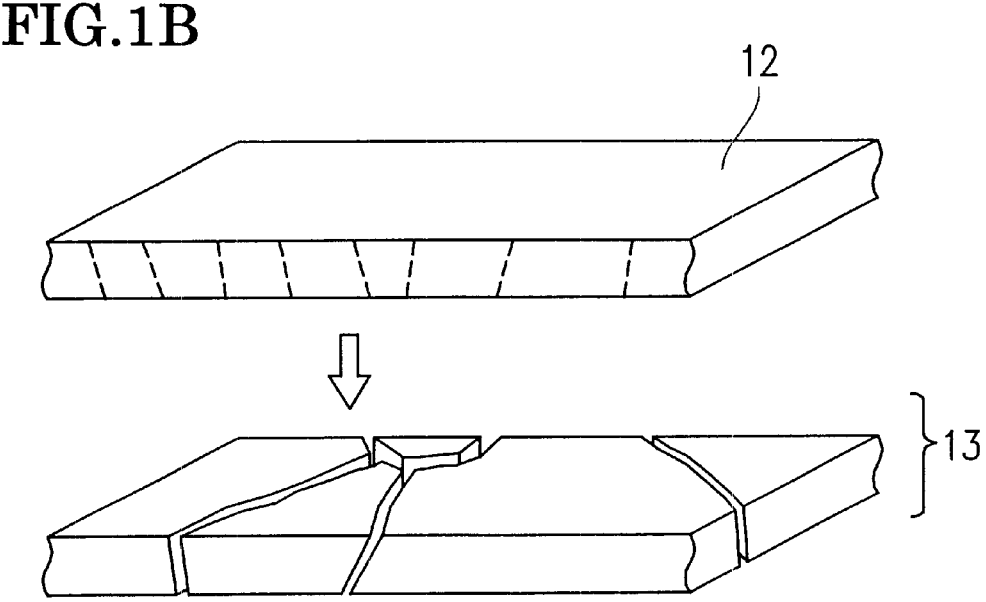
FIG. 1B is a perspective view schematically illustrating an alloy strip before pulverization and pulverized powder particles in a conventional technique.

FIG. 1A schematically illustrates an alloy strip 10 before pulverization and powder particles 11 after pulverization in the magnet powder production method according to the present invention. FIG. 1B schematically illustrates an alloy strip 12 before pulverization and powder particles 13 after pulverization in a conventional magnet powder production method.

As shown in FIG. 1A, according to the present invention, the alloy strip 10 before pulverization, which is constructed of isometric crystallites having a small grain size, is likely to rupture in random orientations and thus form the isometric powder particles 11. On the contrary, in the conventional method, as shown in FIG. 1B, the alloy strip 12 is likely to rupture in a direction substantially vertical to the surface of the alloy strip 12. The resultant particles 13 are therefore flat.

If a molten alloy is rapidly solidified in a decompressed atmosphere, crystallites (average grain size: 150 nm or less) of a compound having an $R_2Fe_{14}B$ crystal structure can be uniformly formed although the content of rare earth metal is small. This makes it possible to manufacture a permanent magnet exhibiting excellent magnetic properties.

On the contrary, if a molten alloy having the above composition is chilled under a normal atmospheric pressure, the cooling rate of the molten alloy is not uniform. As a result, α-Fe crystals are easily formed, thereby blocking formation of a compound having a $R_2Fe_{14}B$ crystal structure. The non-uniformity in cooling rate also causes a problem of generating a non-uniform phase. When such a phase is heat-treated for crystallization, crystal grains are made coarse and large.

The permanent magnet powder of the present invention includes the soft magnetic phase composed of iron and an alloy of iron and boron and the hard magnetic compound phase having a $R_2Fe_{14}B$ crystal structure, which exist in a blended state and both have a small average crystal grain size. This strengthens exchange coupling.

Alloy Composition

The rare earth element R is indispensable for the hard magnetic $R_2Fe_{14}B$ phase that is required for obtaining permanent magnetic properties. If the molar fraction (x) of R is less than 1 at %, it is not possible to generate a compound phase having a $R_2Fe_{14}B$ crystal structure, and thus the effect of providing a coercive force is small. If the molar fraction exceeds 6 at %, the hard magnetic $R_2Fe_{14}B$ phase will not be generated, and thus the coercive force is markedly reduced. In view of these, the molar fraction x of the rare earth element R needs to satisfy 1 at $\% \leq x \leq 6$ at %, preferably 2 at $\% \leq x \leq 5.7$ at %.

Boron (B) is an indispensable element for the soft magnetic Fe boride such as $Fe_3B$ and $Fe_{23}B_6$ of a permanent magnet material and the hard magnetic $R_2Fe_{14}B$ phase. If the molar fraction (y) of B is less than 15 at %, the amorphous structure is less likely to be obtained when the molten alloy is quenched to have a desired thickness by liquid quenching. More specifically, when a molten material alloy is rapidly solidified to form a quenched alloy by the single roll method under the conditions under which the resultant thickness will be in the range of 70 μm to 300 μm, no preferable microstructure is produced. Such an alloy will not exhibit sufficient permanent magnetic properties even after it is heat-treated. If the molar fraction exceeds 25 at %, the squareness ratio Jr/Js of a demagnetization curve markedly decreases, unfavorably reducing the residual flux density $B_r$. In view of these, the molar fraction y of boron needs to satisfy 15 at $\% \leq y \leq 25$ at %, preferably 16 at $\% \leq y \leq 20$ at %. Part of boron atoms in the above compounds may be replaced with carbon atoms.

An element M may be added to the material, where M is at least one element selected from the group consisting of Al, Si, Ti, V, Cr, Mn, Ni, Cu, Zn, Ga, Zr, Nb, Mo, Ag, Hf, Ta, W, Pt, Au, and Pb. The addition of the element M will provide effects such as improving the squareness ratio Jr/Js and widening the available temperature range in which optimum magnetic properties are exhibited. If the molar fraction of the element M is less than 0.05 at %, the above effects will not be sufficiently obtained. If the molar fraction of the element M exceeds 7 at %, magnetization starts decreasing. In view of these, the molar fraction z of the added element M needs to satisfy 0.05 at $\% \leq z \leq 7$ at %, preferably 0.2 at $\% \leq z \leq 5$ at %.

Cobalt (Co) may also be added to the material. Co may replace part of Fe to provide the effects of improving the squareness ratio and improving the maximum energy product. Therefore, Co is preferably added when improvement of the squareness ratio is especially desired.

Fe occupies the remainder from the total of the above elements.

A preferred embodiment of the method for producing iron-base permanent magnet alloy powder of the present invention will be described.

First, a material represented by the above general formula is prepared and melted under heating to produce a molten alloy. The molten alloy is quenched by melt quenching to form a rapidly solidified alloy including an amorphous phase. As the melt quenching, a strip cast method may be employed, in place of the melt spinning method such as the single roll method. Otherwise, a twin-roll solidifying apparatus may be used as long as a quenched alloy having a thickness of 80 μm to 300 μm can be formed.

Quenching Apparatus

Figure 2A:
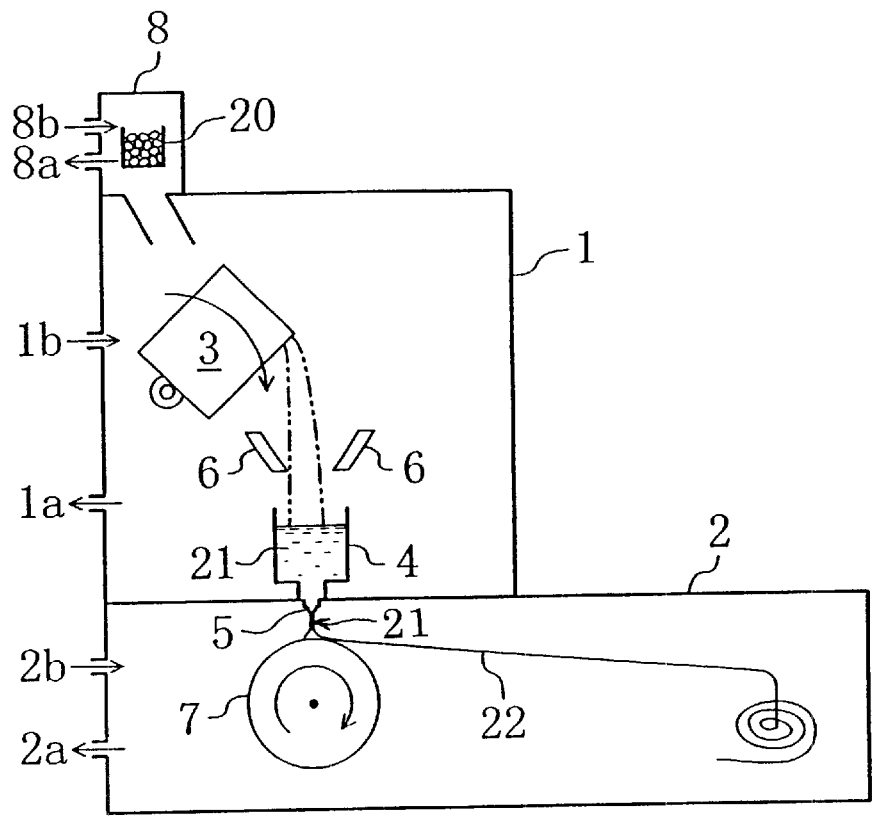
FIG. 2A is a structural view of a melt spinning apparatus (single roll) suitably used in an embodiment of the present invention.
Figure 2B:
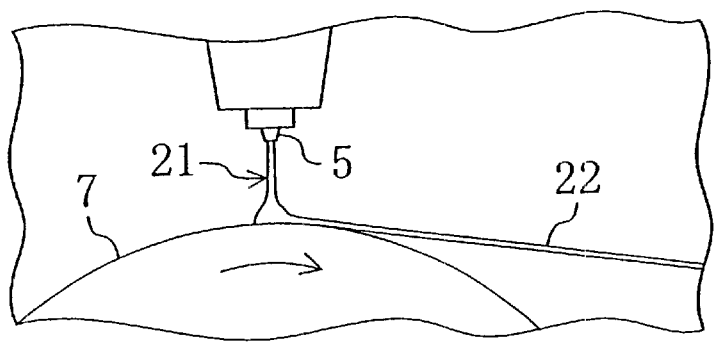
FIG. 2B is a partial enlarged view of FIG. 2A.

In the embodiment of the present invention, a material alloy is prepared using a melt spinning apparatus shown in FIGS. 2A and 2B, for example. The alloy preparation process is carried out in an inert gas atmosphere to prevent the material alloy, which contains an easily oxidizable rare earth element, from being oxidized. The inert gas is preferably a rare gas such as helium or argon, for example. Nitrogen is not preferred as the inert gas because nitrogen easily reacts with a rare earth element.

The apparatus shown in FIGS. 2A and 2B includes material alloy melting and quenching chambers 1 and 2, in which vacuum or inert gas atmosphere is established at an adjustable pressure.

The melting chamber 1 includes: a melt crucible 3; a melt container 4 with a teeming nozzle 5 at the bottom; and an airtight compounded material feeder 8. A material alloy 20, which has been compounded to have a desired magnet alloy composition and supplied from the feeder 8, is melted in the melt crucible 3 at an elevated temperature. A molten alloy 21 is poured into the container 4, which is provided with a heater (not shown) for keeping the temperature of the melt teemed therefrom at a predetermined level.

The quenching chamber 2 includes a rotary chill roll 7 for rapidly solidifying the molten alloy 21 propelled against the roll 7 through the teeming nozzle 5.

In this apparatus, the atmosphere and the pressure inside the melting and quenching chambers 1 and 2 are controllable within prescribed ranges. For this purpose, atmosphere gas inlet ports 1b, 2b, and 8b and outlet ports 1a, 2a, and 8a are provided at appropriate positions of the apparatus. In particular, the outlet port 2a is connected to a pump for controlling the absolute pressure in the quenching chamber 2 within the range 0 to 50 kPa.

The melt crucible 3 may be inclined at a desired angle to pour the molten alloy 21 through a funnel 6 into the container 4. The molten alloy 21 is heated in the container 4 by a heater (not shown).

The teeming nozzle 5 of the container 4 is positioned on the boundary wall between the melting chamber 1 and the quenching chamber 2 to propel the molten alloy 21 in the container 4 against the surface of the chill roll 7, which is located just under the nozzle 5. The orifice diameter of the nozzle 5 may be in the range of 0.5 to 2.0 mm, for example. If the viscosity of the molten alloy 21 is high, the molten alloy 21 cannot flow through the teeming nozzle 5 easily. In this embodiment, however, the quenching chamber 2 is kept at a pressure lower than the melting chamber 1, thereby establishing a pressure difference between the melting and quenching chambers 1 and 2. This allows the molten alloy 21 to be teemed smoothly.

The chill roll 7 is preferably formed of Cu, Fe, or an alloy containing Cu and Fe. If a material other than Cu or Fe is used to manufacture the chill roll, the releasability of the quenched alloy from the chill roll 7 is poor. The quenched alloy may unfavorably wind around the chill roll 7. The diameter of the chill roll 7 is in the range of 300 to 500 mm, for instance. The water-cooling capability of a water cooler provided inside the chill roll 7 is calculated and adjusted based on the latent heat of solidification and the amount of teemed molten alloy per unit time.

The surface of the chill roll 7 may be plated with a chromium layer, for example. As for the surface roughness, the chill roll 7 preferably has a center line average height $Ra \leq 0.8$ μm, a maximum roughness $Rmax \leq 3.2$ μm, and a ten-point average roughness $Rz \leq 3.2$ μm. If the surface of the chill roll 7 is rough, the quenched alloy is unfavorably likely to stick to the roll.

The apparatus shown in FIGS. 2A and 2B can rapidly solidify a total of 20 kg of material alloy in 15 to 30 minutes, for example. The thus-produced quenched alloy is in the form of a thin strip (or ribbon) 22 having a thickness of 80 μm to 300 μm and a width of 2 mm to 6 mm.

Quenching Method

First, the molten alloy 21 of the material alloy, which is represented by the above general formula, is prepared and stored in the container 4 of the melting chamber 1. Next, the molten alloy 21 is teemed through the teeming nozzle 5 onto the chill roll 7 in the reduced Ar atmosphere, to come into contact with, and be quenched and solidified by, the chill roll 7. In this rapid solidification, the cooling rate should be controllable with high precision.

In this embodiment, in chilling and solidifying the molten alloy 21, the cooling rate is set in the range of $10^3$ to $10^{5\circ}$ C./sec. The temperature of the alloy is lowered by $\Delta T1$ at the cooling rate within this range. The temperature of the molten alloy 21 yet to be quenched is approximately equal to the melting point Tm of the alloy (e.g., in the range of 1,200° C. to 1,300° C.). That is to say, the temperature of the alloy decreases from Tm to (Tm–$\Delta T1$) on the chill roll 7. According to the results of experiments carried out by the present inventors, $\Delta T1$ is preferably in the range of 700° C. to 1100° C. from the standpoint of improving the properties of a final magnet product.

The interval during which the molten alloy 21 is chilled by the chill roll 7 is equivalent to the interval between a point in time the alloy comes into contact with the circumference of the rotating chill roll 7 and a point in time the alloy detaches itself therefrom. In this embodiment, the interval is in the range of 0.05 to 50 milliseconds. In the meantime, the alloy has its temperature decreased by $\Delta T1$ to solidify. Thereafter, the solidified alloy detaches itself from the chill roll 7 and travels in the inert gas atmosphere. While the thin-strip alloy is traveling, the alloy has its heat absorbed by the atmosphere gas. As a result, the temperature of the alloy further decreases by $\Delta T2$, and is now (Tm–$\Delta T1$–$\Delta T2$). $\Delta T2$ is variable depending on the size of the apparatus and the pressure of the atmosphere gas, but typically about 100° C. or more.

The atmosphere inside the quenching chamber 2 is put in a decompressed state, which is preferably composed of an inert gas having an absolute pressure of 50 kPa or less. If the pressure of the atmosphere gas exceeds 50 kPa, existence of the atmosphere gas between the rotating chill roll and the molten alloy becomes significantly influential. This may disadvantageously lead to failure in obtaining a uniform structure.

In this embodiment, the thickness of the quenched alloy strip is set in the range of 80 μm to 300 μm by adjusting the surface velocity of the chill roll to fall within the range of 1 m/sec to 13 m/sec. If the roll surface velocity is less than 1 m/sec, the resultant average crystal grain size is disadvantageously too large to provide desired magnetic properties. If the roll surface velocity exceeds 13 m/sec, the thickness of the resultant quenched alloy strip is below 70 μm. Using the alloy strip with this thickness, only powder particles having a ratio of minor axis size to major axis size of less than 0.3 are produced in a pulverizing process described later.

Heat Treatment

After the melt quenching process, the quenched alloy is heat-treated for crystallization to obtain crystallites having an average grain size of 100 nm or less. The heat treatment is preferably performed at 400° C. to 700° C., more preferably at 500° C. to 700° C., for 30 seconds or more. If the temperature of the heat treatment exceeds 700° C., grains remarkably grow, resulting in degrading magnetic properties. If the temperature is less than 400° C., the $R_2Fe_{14}B$ phase is not generated, which will result in failure to obtain high coercive force.

By heat-treating the alloy under the above conditions, crystallites (of iron, an alloy of iron and boron, and a compound having a $R_2Fe_{14}B$ crystal structure) can be formed to have an average grain size of 150 nm or less. The preferred heat treatment time varies depending on the heat treatment temperature. For example, when the alloy strip is to be heat-treated at 600° C., the heat treatment time is preferably in the range of about 30 seconds to about 30 minutes. If the heat treatment time is less than 30 seconds, crystallization may not be completed.

Before the heat treatment, the alloy may preferably be pulverized coarsely into powder having an average particle size of about 1 mm to about 500 μm.

Pulverizing Process

Figure 4:
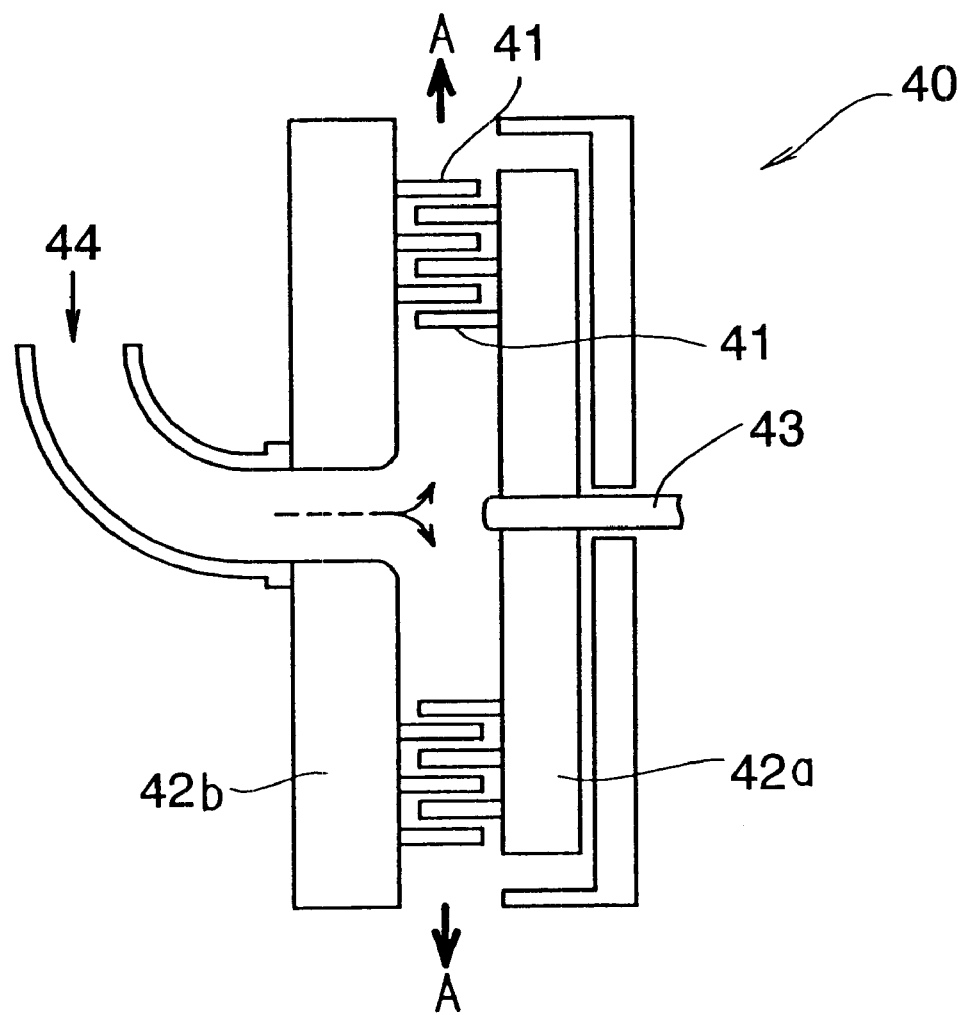
FIG. 4 is a view illustrating a pin disk mill used in the present invention.
Figure 5:
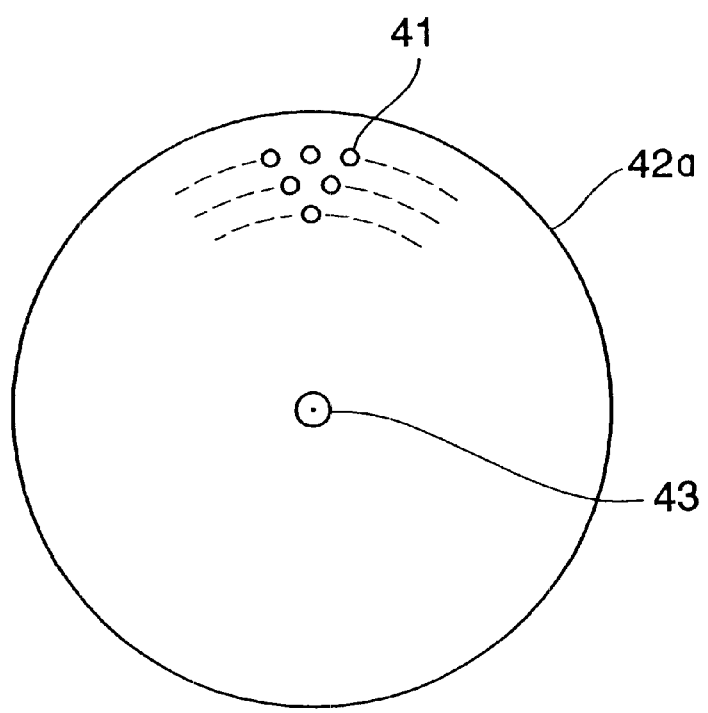
FIG. 5 is a view illustrating pin arrangement of the pin disk mill in FIG. 4.

The alloy according to the present invention can be pulverized with a pin mill as shown in FIG. 4, which is a cross-sectional view illustrating a pin mill 40 used for this embodiment. The pin mill 40 is a pin disk mill, which has two disks 42a and 42b facing each other. A plurality of pins 41 are arranged on one surface of each of the disks 42a and 42b so that the pins 41 protruding from the two disks do not abut against each other. At least one of the disks 42a and 42b rotates at high speed. In the example shown in FIG. 4, the disk 42a rotates around an axis 43. FIG. 5 is a front view of the rotating disk 42a, illustrating the concentrically arranged pins 41 on the disk 42a. The pins 41 are also arranged concentrically on the fixed disk 42b.

Objects to be pulverized by the pin disk mill are fed into a space formed between the two disks facing each other through an inlet 44. The objects collide against the pins 41 on the rotating disk 42a and the pins 41 on the fixed disk 42b, to be pulverized by the impact at the collision. Powder produced by the pulverization is expelled in the directions indicated by the arrows A and finally collected in one place.

In the pin mill 40 used in this embodiment, the disks 42a and 42b supporting the pins 41 are made of stainless steel or the like, while the pins 41 are made of a cemented carbide such as a tungsten carbide (WC) sintered body. As the cemented carbides other than the WC sintered body, preferably used are TiC, MoC, NbC, TaC, $Cr_3C2$, and the like. These cemented carbides are sintered bodies obtained by binding powder of carbides of metals of the IVa, Va, and VIa groups using Fe, Co, Ni, Mo, Cu, Pb, or Sn, or an alloy thereof.

According to the present invention, if pulverization is carried out using the pin mill described above under conditions allowing for an average particle size falling within the range of 1 µm to 300 µm, it is possible to obtain powder of which particles has a ratio of minor axis size to major axis size in the range of 0.3 to 1.0. The average particle size is more preferably in the range of 5 µm to 200 µm.

A pin mill in which a plurality of pins are arranged on a cylindrical body can be used for the pulverization.

Magnet Manufacturing Method

First, a binder of an epoxy resin and an additive are added to the thus-obtained magnet powder and kneaded to form a compound. Next, the compound is compacted using a press having a cavity corresponding to a desired end shape of the compound. Subsequently, the resultant compact is cured, cleaned, coated, tested, and then magnetized to obtain a final bonded magnet.

In place of the above compaction, known extrusion molding, injection molding, or calender rolling may be used. In these cases, the magnet powder will be kneaded with synthetic resin, rubber or the like, which is selected depending on the type of the molding process employed.

When injection molding is employed, not only polyimide (nylon) widely used as a resin, but also a high-softening-point resin such as PPS (polyphenylene sulfide) may be used. This is because the magnet powder according to the present invention is made of an alloy containing a small fraction of rare-earth elements and therefore is less likely to be oxidized. Accordingly, even when the magnet powder is molded by the injection process at a relatively high temperature, the magnetic properties thereof do not deteriorate.

In addition, since the magnet powder according to the present invention is less likely to be oxidized, there is no need to coat the surface of a final magnet product with a resin film. Thus, it is possible to produce a component integrally including a magnet of a complicated shape by injecting the magnet powder according to the present invention, along with a molten resin, into a slot of the complicated shape in the component.

Electrical Appliances

The present invention is suitably applied to an interior permanent magnet (IPM) type motor, for example. That is, an IPM type motor may include, incorporated in its rotor, magnets manufactured using the magnet powder according to the present invention.

An IPM type motor in a preferred embodiment includes: a rotor core incorporating bonded magnets made of the above magnet powder compacted at high density; and a stator surrounding the rotor core. The rotor core has a plurality of slots, and the magnets according to the present invention are located in the respective slots. The magnets are formed by melting a compound of magnet powder according to the present invention, and directly filling the slots of the rotor core with the molten compound, to mold the compound.

The magnet according to the present invention can be suitably used not only for the above type of motor, but also other types of motors, actuators, and other various electrical appliances.

EXAMPLES

Hereinafter, examples of the present invention will be described.

Fe, Co, B, Nd, and Pr having a purity of 99.5% or more were weighed to be 100 grams in total and fed into a quartz crucible for each of Examples No. 1 to No. 6, of which compositions are as shown in Table 1 below. The quartz crucible has an orifice having a diameter of 0.8 mm at the bottom. After the above material were melted in the quartz crucible, therefore, the resultant molten alloy flowed downward through the orifice. The material was melted in an argon atmosphere with a pressure of 2 kPa by high-frequency heating. In these examples, the temperature of the melt was set at 1350° C.

A copper chill roll was disposed under the orifice at a position 0.8 mm apart from the orifice. A pressure of 32 kPa was applied to the surface of the molten alloy in the crucible to allow the molten alloy to spurt against the outer circumference of the copper roll. The roll was rotated at high speed while the inside thereof was cooled so as to keep the temperature of the outer circumference at about room temperature. The molten alloy that dropped through the orifice lost heat when it came into contact with the outer circumference of the roll, and was splashed in the direction of the circumferential velocity. Since the molten alloy dropped continuously onto the circumference of the roll through the orifice, the rapidly solidified alloy was in the form of an elongate thin strip (width: 2 to 5 mm, thickness: 70 to 300 µm).

In the chill roll (single roll) method employed in these examples, the cooling rate is defined by the roll surface velocity and the amount of molten alloy flowing per unit time. The melt flow amount depends on the diameter (cross sectional area) of the orifice and the pressure to the molten alloy. In these examples, the diameter of the orifice was set at 0.8 mm, and the pressure to the molten alloy was set at 30 kPa. The flowing rate was therefore about 0.1 kg/sec. In these examples, the roll surface velocity Vs was set in the range of 2 to 12 m/sec. The thickness of the resultant quenched alloy strip was in the range of 85 to 272 µm.

In order to allow the rapidly solidified alloy to form an amorphous phase therein, the cooling rate is preferably $10^{3\circ}$ C./sec or more. To obtain the cooling rate in this range, the roll surface velocity is preferably set at 2 m/sec or more.

Figure 3:
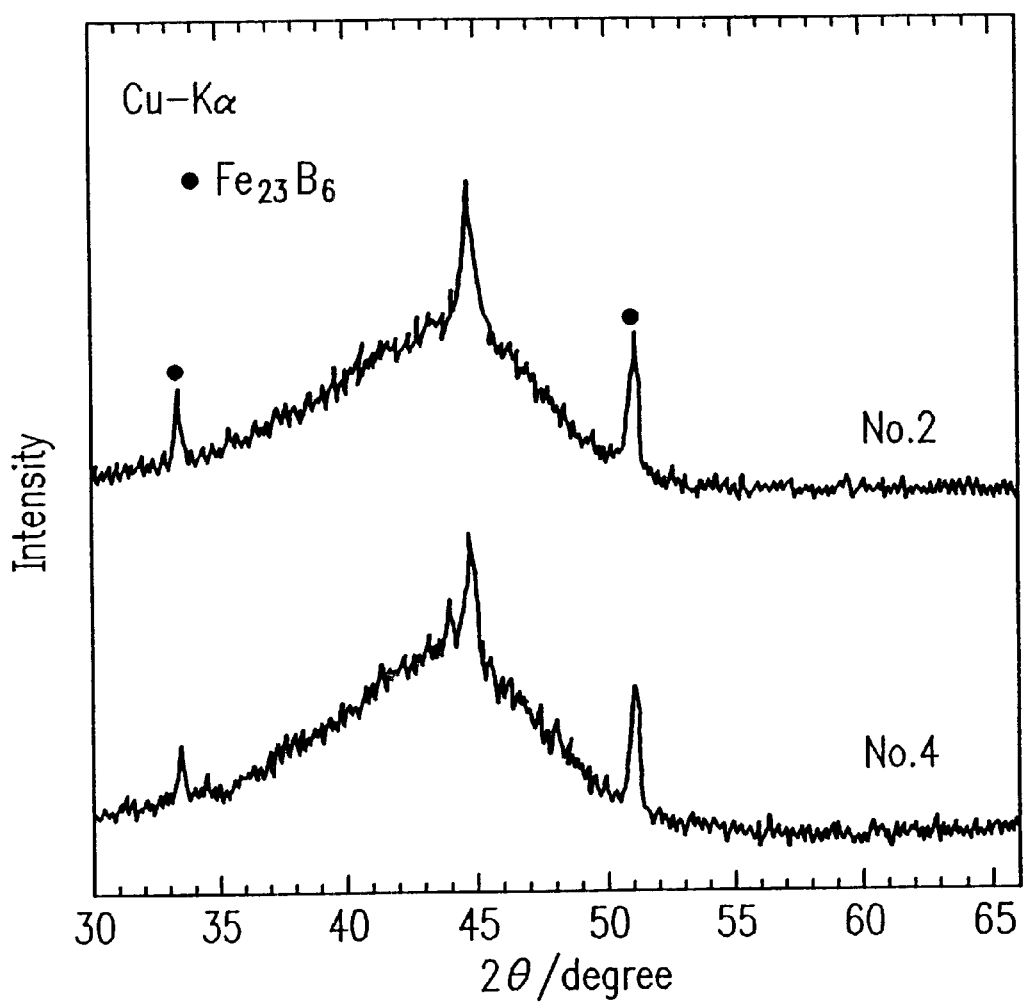
FIG. 3 is a graph showing powder X-ray diffraction patterns in examples according to the present invention.

The thus-obtained quenched alloy strips were subjected to X-ray analysis using CuK a radiation. FIG. 3 shows powder X-ray diffraction patterns for Examples No. 2 and No. 4. As is observed from FIG. 3, the rapidly solidified alloy strips in Examples No. 2 and No. 4 include an amorphous structure and a metal structure containing $Fe_{23}B_6$.

The above magnet powder of each example was kneaded with 2% by mass of an epoxy resin, and compacted under a pressure of $5.9 \times 10^8$ Pa to obtain a cylindrical compact having a diameter of 10 mm and a height of 7 mm. The compact was then cured for one hour at 150° C. to obtain a bonded magnet. Table 3 below shows the magnetic properties and the magnet powder packing density of the respective bonded magnets. The magnet powder packing density in Table 3 was obtained by calculating a ratio of "volume of alloy/volume of bonded magnet".

TABLE 1

| | No. | Alloy composition (at %) | | | | Roll surface velocity Vs (m/s) | Heat Treatment (° C.) | Alloy thickness |
| | | R | Fe | B | M | | | |
|---|---|---|---|---|---|---|---|---|
| Example | 1 | Nd3 | Remainder | 18.5 | — | 12 | 620 | 87 |
| | 2 | Nd4 | remainder | 18.5 | — | 8 | 640 | 144 |
| | 3 | Nd4.5 | remainder | 17.0 | Co1 | 2 | 650 | 255 |
| | 4 | Nd.5.5 | remainder | 19.0 | Co5 + Cr5 | 6 | 680 | 170 |
| | 5 | Nd2.5 + Pr2 | remainder | 16.0 | Co3 + Ga1 | 9 | 630 | 120 |
| | 6 | Nd3.5 + Dy1 | remainder | 18.5 | Co3 + Si1 | 7 | 640 | 150 |
| Comparative examples | 7 | Nd3 | remainder | 18.5 | — | 15 | 620 | 61 |
| | 8 | Nd4.5 | remainder | 17.0 | Co1 | 20 | 650 | 30 |
| | 9 | Nd3.5 + Dy1 | remainder | 18.5 | Co3 + Si1 | 30 | 640 | 22 |

In Table 1, "Nd5.5" in "R" column, for example, represents that 5.5 at % of Nd was added as a rare earth element, and "Nd2.5±Pr2", for example, represents that 2.5 at % of Nd and 2at % of Pr were added as rare earth elements.

In resultant quenched alloy strips were coarsely pulverized to obtain alloy powder having an average particle size of 850 μm or less, and then heat-treated at respective temperatures shown in Table 1 for 10 minutes in an argon atmosphere. Subsequently, the coarsely pulverized powder was finely pulverized into particles having a size of 150 μm or less, to obtain magnet powder according to the present invention. Table 2 below shows the magnetic properties of the magnet powder of the respective examples, along with the ratio of minor axis size to major axis size of the powder particles having a size of 40 μm or more.

TABLE 2

| | No. | Magnetic properties of magnet powder | | | Minor axis/ major axis |
| | | $B_r$(T) | $H_{cJ}$(kA/m) | $(BH)_{max}$(kJ/m³) | |
|---|---|---|---|---|---|
| Examples | 1 | 1.22 | 245 | 76 | 0.33 |
| | 2 | 1.08 | 265 | 82 | 0.58 |
| | 3 | 1.11 | 300 | 95 | 0.83 |
| | 4 | 0.79 | 610 | 72 | 0.92 |
| | 5 | 1.20 | 310 | 98 | 0.44 |
| | 6 | 1.15 | 360 | 102 | 0.75 |
| Comparative Examples | 7 | 1.21 | 250 | 72 | 0.21 |
| | 8 | 1.09 | 305 | 89 | 0.14 |
| | 9 | 1.14 | 358 | 98 | 0.08 |

As is seen from Table 2, the ratios of minor axis size to major axis size of the magnet powder of examples 1 to No. 6 were all within the range of 0.3 to 1.0.

TABLE 3

| | No. | Magnetic properties of compacted bonded magnet | | | Magnet powder packing density (%) |
| | | $B_r$(T) | $H_{cJ}$(kA/m) | $(BH)_{max}$(kJ/m³) | |
|---|---|---|---|---|---|
| Examples | 1 | 0.99 | 243 | 56 | 81 |
| | 2 | 0.89 | 264 | 61 | 82 |
| | 3 | 0.93 | 297 | 71 | 84 |
| | 4 | 0.67 | 598 | 54 | 85 |
| | 5 | 0.98 | 310 | 72 | 82 |
| | 6 | 0.95 | 358 | 76 | 83 |
| Comparative Examples | 7 | 0.93 | 248 | 50 | 77 |
| | 8 | 0.83 | 299 | 59 | 76 |
| | 9 | 0.86 | 354 | 65 | 75 |

As is found from Table 3, the compacted bonded magnets according to the present invention provide magnet powder packing densities as high as 80% or more.

Comparative Examples

Comparative Examples No. 7 to No. 9 were manufactured in the same manner as that described with reference to the above examples, except that the roll surface velocity at the quenching of the molten alloy was adjusted to be in the range of 15 m/sec to 30 m/sec, thereby obtaining the thickness of the quenched alloy strips in the range of 20 μm to 65 μm.

In the comparative examples, the magnetic properties and the ratios of minor axis size to major axis size of the resultant magnet powder are shown in Table 2, and the magnetic properties and the magnet powder packing densities of the compacted bonded magnets are shown in Table 3. As is found from Table 2, the ratios of minor axis size to major axis size of the comparative examples are less than 0.3. As is found from Table 3, the magnet powder packing densities of the comparative examples are 80% or less.

Figure 6:
FIG. 6 is a scanning electron microscope (SEM) photograph of a cross section of a bonded magnet according to the present invention.
Figure 7:
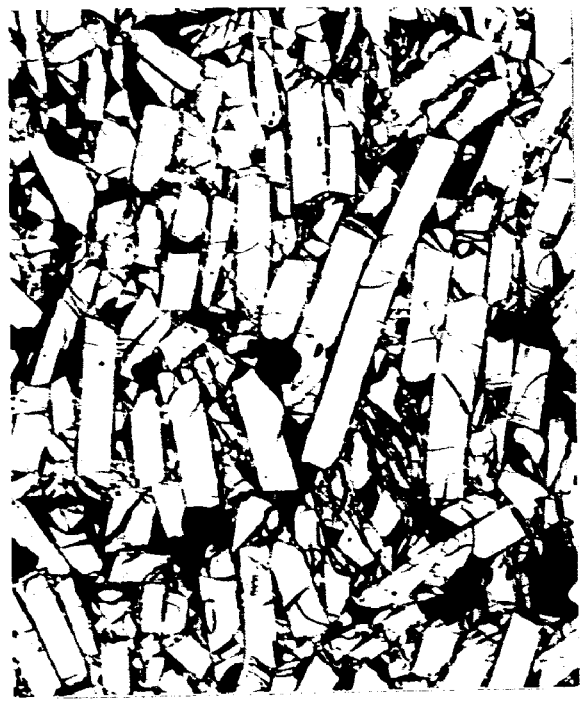
FIG. 7 is a SEM photograph of a cross section of a bonded magnet of a comparative example.

FIG. 6 is a scanning electron microscope (SEM) photograph of a cross section of a bonded magnet manufactured by compacting the powder according to the present invention. FIG. 7 is a SEM photograph of a cross section of a bonded magnet manufactured by compacting powder, MQP-B of MQI Corp. (comparative example). In the case of the present invention, 60 wt. % or more of powder particles having a size of 40 µm or more have a ratio of minor axis size to major axis size of 0.3 or more. In the case of the comparative example, most of powder particles having a size of 40 µm or more have a ratio of minor axis size to major axis size of less than 0.3, although some of powder particles having a size of 0.5 µm or less may have a ratio of minor axis size to major axis size of 0.3 or more.

Thus, according to the present invention, iron-base alloy permanent magnet powder with improved packing density and flowability during compaction is obtained. By use of such iron-base alloy permanent magnet powder, provided are bonded magnets with improved magnet powder packing density, and electrical appliances including such bonded magnets.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

I claim:

1. An iron-base alloy permanent magnet powder represented by a general formula, $Fe_{100-x-y}R_xB_y$, wherein:

R is at least one kind of rare earth element selected from the group consisting of Pr, Nd, Dy, and Tb;

x and y satisfy the relationships of 1 at $\% \leq x \leq 6$ at %, and 15 at $\% \leq y \leq 25$ at %;

the powder contains iron, an alloy of iron and boron, and a compound having a $R_2Fe_{14}B$ crystal structure as component phases, the average crystal grain sizes of said component phases being 150 nm or less, the average particle size of the powder is 300 µm or less, and a ratio of minor axis size to major axis size of powder particles is in a range of 0.3 to 1.0.

2. A bonded magnet comprising the iron-base alloy permanent magnet powder according to claim 1.

3. An electrical appliance comprising a bonded magnet according to claim 2.

4. The iron-base alloy permanent magnet powder according to claim 1, wherein the average particle size of the powder is in the range of 50 µm to 300 µm.

5. An iron-base alloy permanent magnet powder represented by a general formula, $Fe_{100-x-y-z}R_xB_yM_z$, wherein:

R is at least one kind of rare earth element selected from the group consisting of Pr, Nd, Dy, and Tb;

M is at least one kind of element selected from the group consisting of Al, Si, Ti, V, Cr, Mn, Ni, Cu, Zn, Ga, Zr, Nb, Mo, Ag, Hf, Ta, W, Pt, Au, and Pb:

x, y, and z satisfy the relationships of 1 at $\% \leq x \leq 6$ at %, 15 at $\% \leq y \leq 25$ at %, and 0.05 at $\% \leq z \leq 7$ at %, respectively;

the powder contains Fe boride and a compound having a $R_2Fe_{14}B$ crystal structure as component phases, the average crystal grain sizes of said component phases being 150 nm or less, the average particle size of the powder is 300 µm or less, and a ratio of minor axis size to major axis size of powder particles is in a range of 0.3 to 1.0.

\* \* \* \* \*